Figure 1:
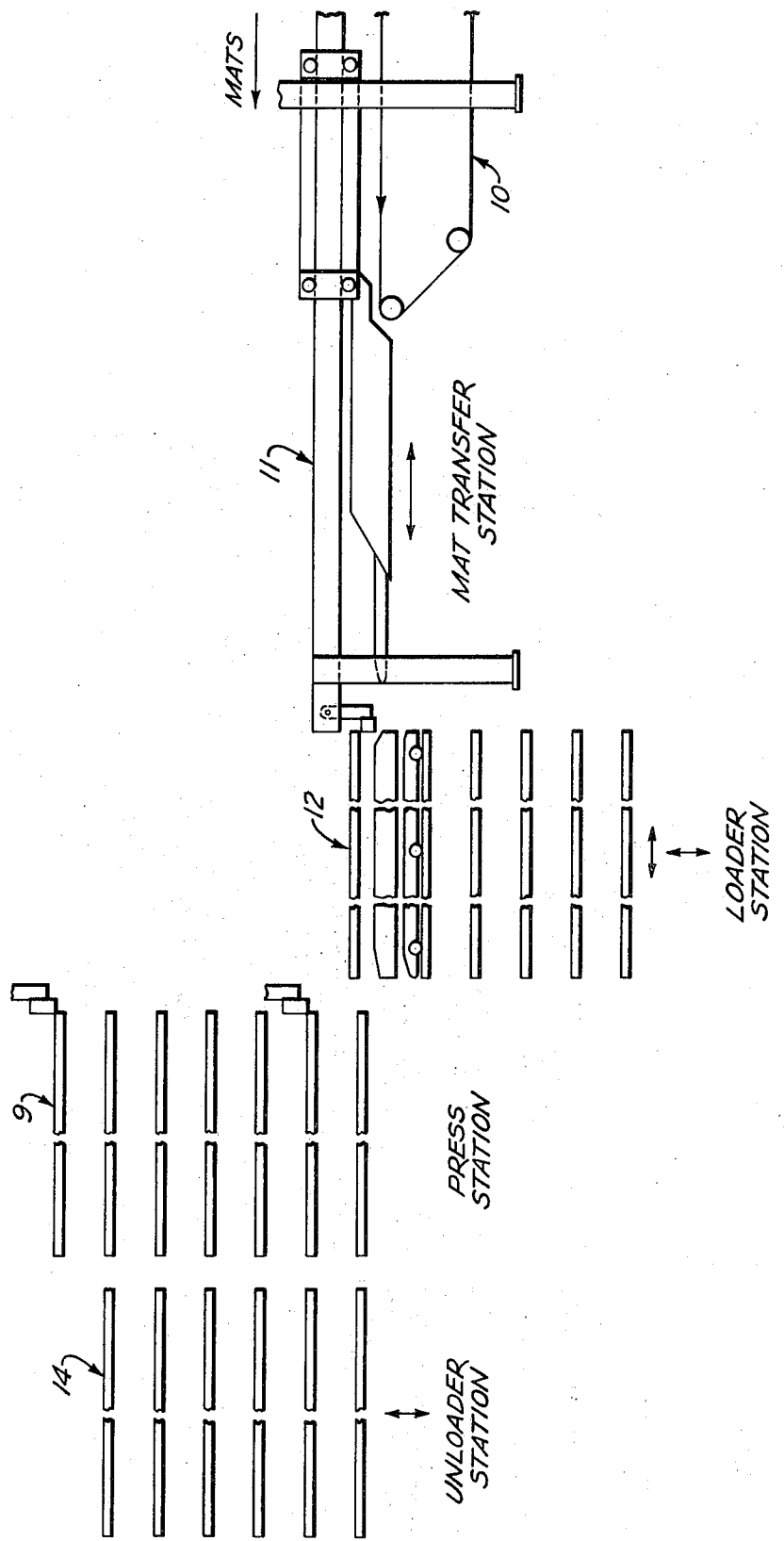

United States Patent [19]
Greenberger

[11] 3,791,538
[45] Feb. 12, 1974

[54] METHOD OF AND APPARATUS FOR HANDLING FIBERBOARD

[75] Inventor: Joseph Irwin Greenberger, Pittsburgh, Pa.

[73] Assignee: Wean United, Inc., Pittsburgh, Pa.

[22] Filed: Feb. 10, 1972

[21] Appl. No.: 225,235

[30] Foreign Application Priority Data
Mar. 23, 1971  Great Britain ...................... 7851/71

[52] U.S. Cl. ................................ 214/16.6, 214/152
[51] Int. Cl. ............................................ B65g 47/02
[58] Field of Search..... 214/16.4 R, 16.6, 1 BE, 152

[56] References Cited
UNITED STATES PATENTS
| | | | |
|---|---|---|---|
| 3,398,844 | 8/1968 | Carlsson et al. .................... | 214/16.6 |
| 2,940,617 | 6/1960 | Reed .............................. | 214/1 BE X |

*Primary Examiner*—Frank E. Werner
*Attorney, Agent, or Firm*—Henry C. Westin; Daniel Patch

[57] ABSTRACT

The disclosure of the present invention relates to a method of and apparatus for efficiently and rapidly handling mat particles of wood, for example, fir or hemlock particles used to manufacture fiberboards.

23 Claims, 11 Drawing Figures

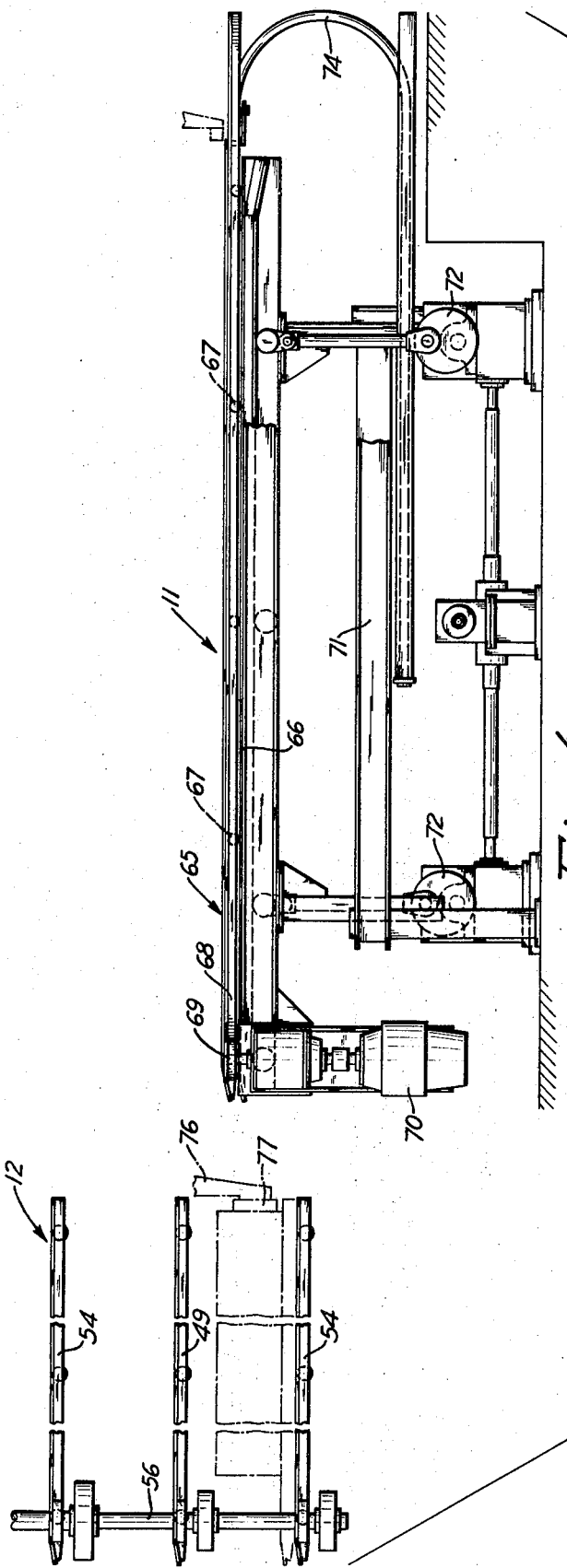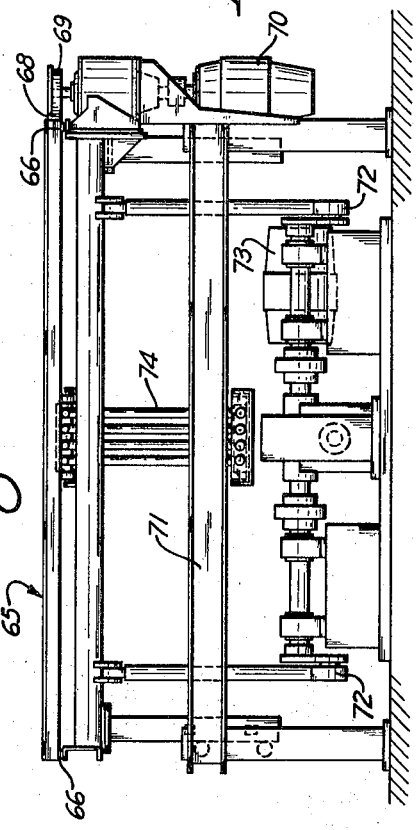

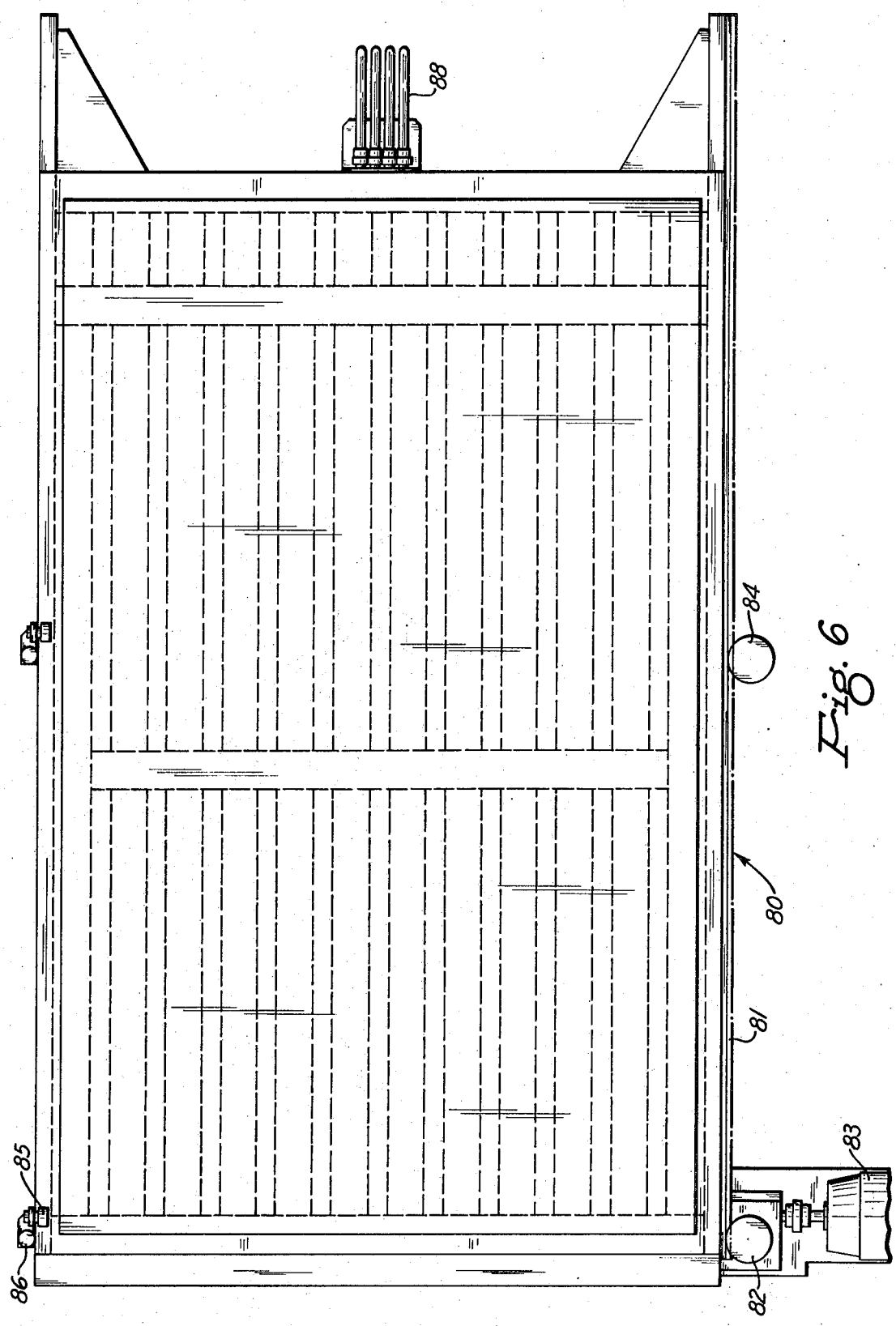

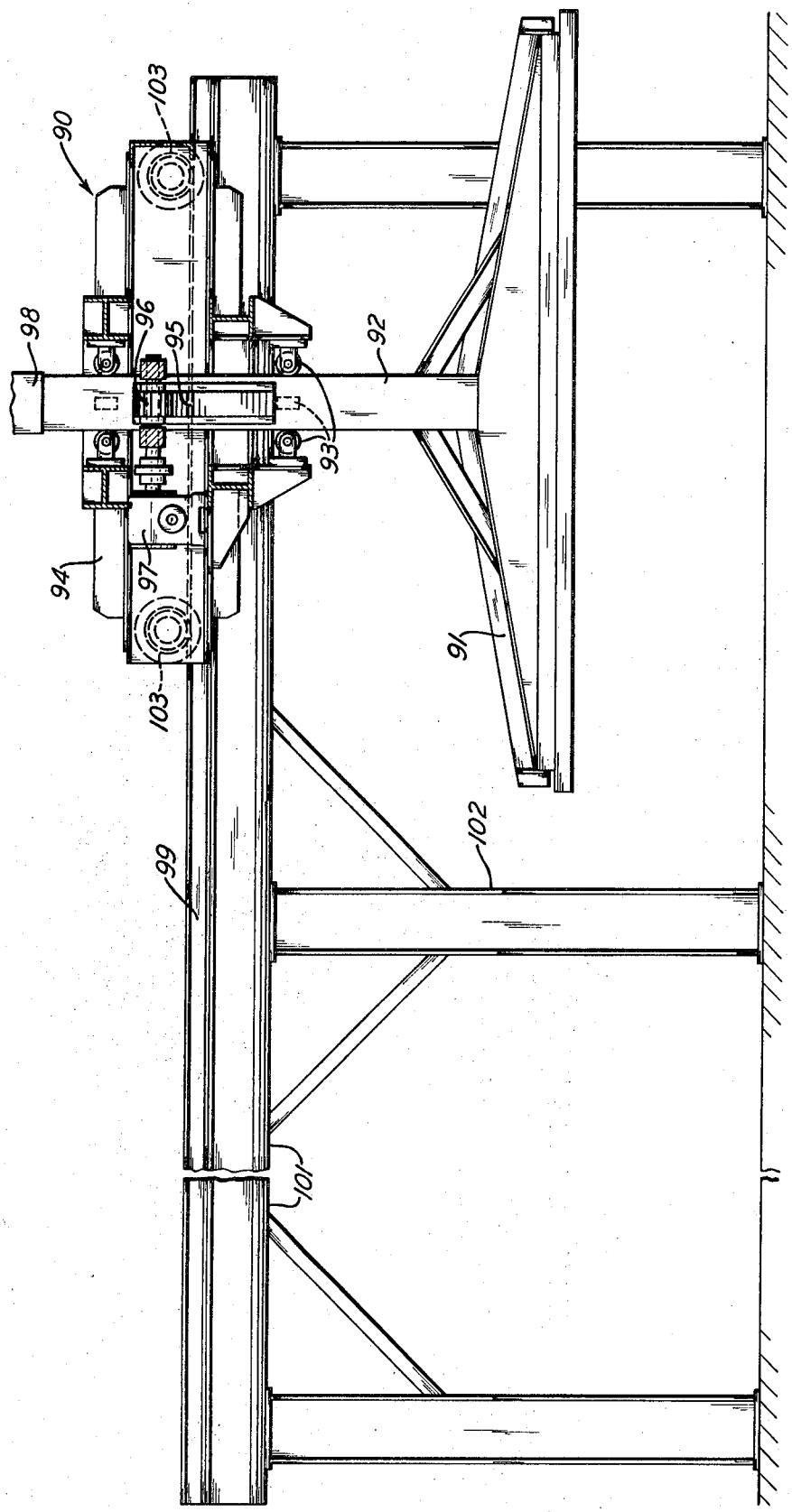

METHOD OF AND APPARATUS FOR HANDLING FIBERBOARD

To a great extent the economy of manufacturing fiberboards and similar products by which several at a time are formed by a pressing operation depends upon the efficiency and the ease of automating the procedures and equipment employed to load and unload the press. The press usually consists of a number of vertically arranged openings formed by pressing platens that are simultaneously forced together to compress into boards piles of mats previously placed in each opening. The fact that the press is capable of producing a great number of boards for an indefinite period of time places an enormous demand on the handling and transfer equipment, particularly, at the upstream side of the press where the product takes the form of very fragile and porous mats, a typical size of which may be 13 ft. long X 8 ft. wide X 4 in. thick. The mere size and incoherent characteristics of the mats make it extremely difficult to design a method and means for obtaining maximum productivity.

It is, therefore, an object of the present invention to provide a method of and apparatus for transferring one or more mats to be formed into boards by a pressing operation comprising in sequene two or more of the following steps: feeding one or more mats to a first station, supporting a mat or mats by a transfer plate while in said first station and while so supported transferring the mat or mats to a second station, applying a gas, such as air, to the surface of a mat adjacent the transfer plate while in said second station to urge the mat or mats away from said adjacent surface, and returning said transfer plate to said first station while the mat or mats are at least partially supported by air to peel the plate from the mat or mats and deposit the mat or mats in said second station.

It is a still further object of the present invention to provide a method and apparatus in accordance with the broad method and apparatus, wherein said first station is a transfer station and said second station is a loading station, comprising the additional steps of lowering a mat in said loading station an amount to allow a second mat to be transferred from said transfer station to the loading station and deposited on top of a first mat, repeating said operation to form a pile of mats in said loading station, vertically moving said pile away from said transfer plate and forming a second pile of mats in said loading station, repeating the piling operation in said loading station until a sufficient number of piles are formed with reference to the number of boards desired to be formed by pressing, engaging the bottom surface of the lowermost mat of each pile by additional transfer plates in said loading station and while so engaged transferring the piles of mats to a press, applying a gas, such as air, to the bottom surface of the lowermost mat of each pile while in said press to support, at least partially, the piles of mats, and return said additional transfer plates to said loading station while the piles of mats are at least partially supported by air in said press to peel the plates from their associated piles and deposit the piles in said press.

It is a still further object of the present invention, which comprises a method and apparatus, in accordance with the broad method and apparatus, wherein said second station is a loading station comprising the additional steps of: forming a number of piles in said loading station equal in number to the number of board forming openings in a press, at least partially supporting each pile by a transfer plate, causing said plates in unison to transfer their piles to said press, applying a gas, such as air, to the lower surface of the lowermost mat of each pile while in said press to support, at least partially, each pile of mats, returning said plates to said loading station while the piles of mats are at least partially supported by air to peel the plates from the piles and deposit each pile in one of said openings of said press.

Another object is to provide a method and apparatus in accordance with the broad method and apparatus set forth above comprising the additional steps of: causing said transfer plate to engage the adjacent side of a board formed by said press and push the board out of the press when the plate is caused to transfer the next mat or mats to the press to be pressed into board.

A still further object is to provide a method and apparatus in accordance with the broad method and apparatus set forth above, wherein said first station is a transfer station and the second station is a loading station comprising the additional steps of: stacking a number of mats on said transfer plate to form a pile of mats, causing said transfer plate to move said pile to one of several openings formed in said loader station, returning said transfer plate to said transfer station after the pile is deposited in one of said openings, indexing a second opening of said loader station in front of said transfer plate to receive a second pile of mats after it has been formed in said transfer station.

In connection with said last object a method and apparatus of employing a still additional transfer plate to transfer a single mat to said first station, repeating this operation to form a pile of mats on the transfer plate of said first station, in which the plate of the first station is lowered during the pile forming operation with reference to the path of movement of the still additional transfer plate.

Another object of the present invention is to provide in a method and apparatus of employing a transfer plate or plates the steps and means of restraining the edge of the mat or mats in a direction opposite to the direction of movement of the plate or plates during the transfer operation.

Figure 2:
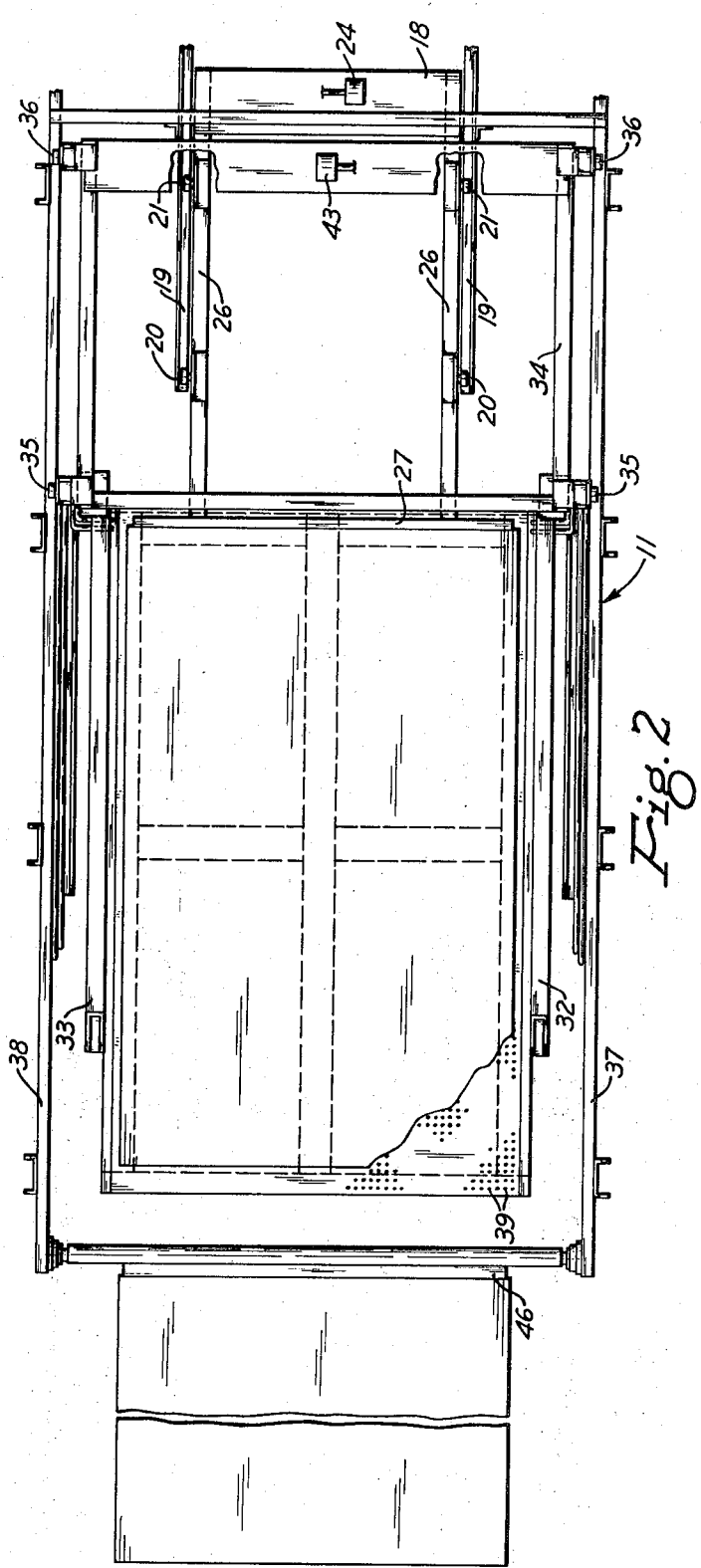
Figure 3:
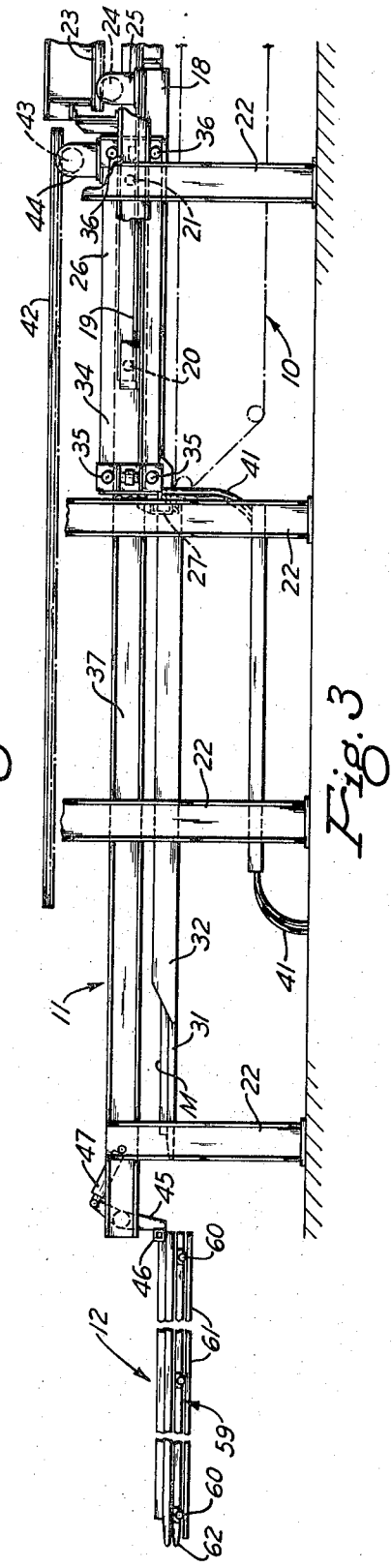
Figure 7:
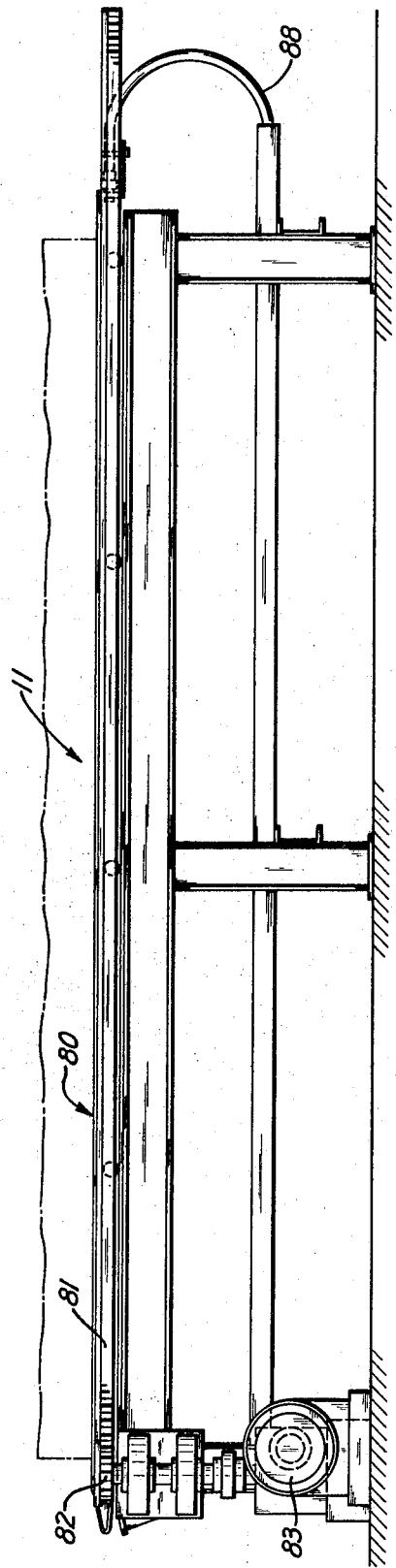
Figure 8:
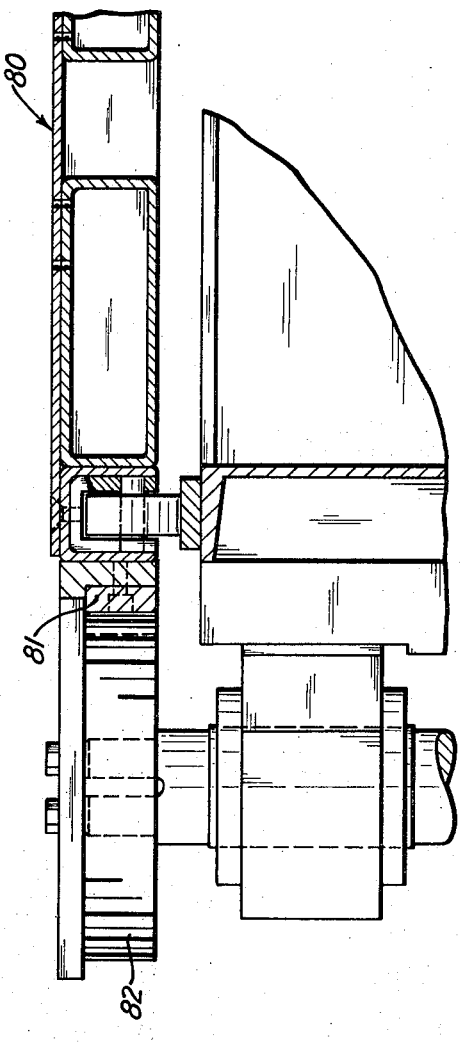
Figure 9:
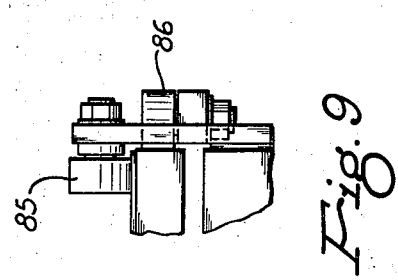
Figure 10:
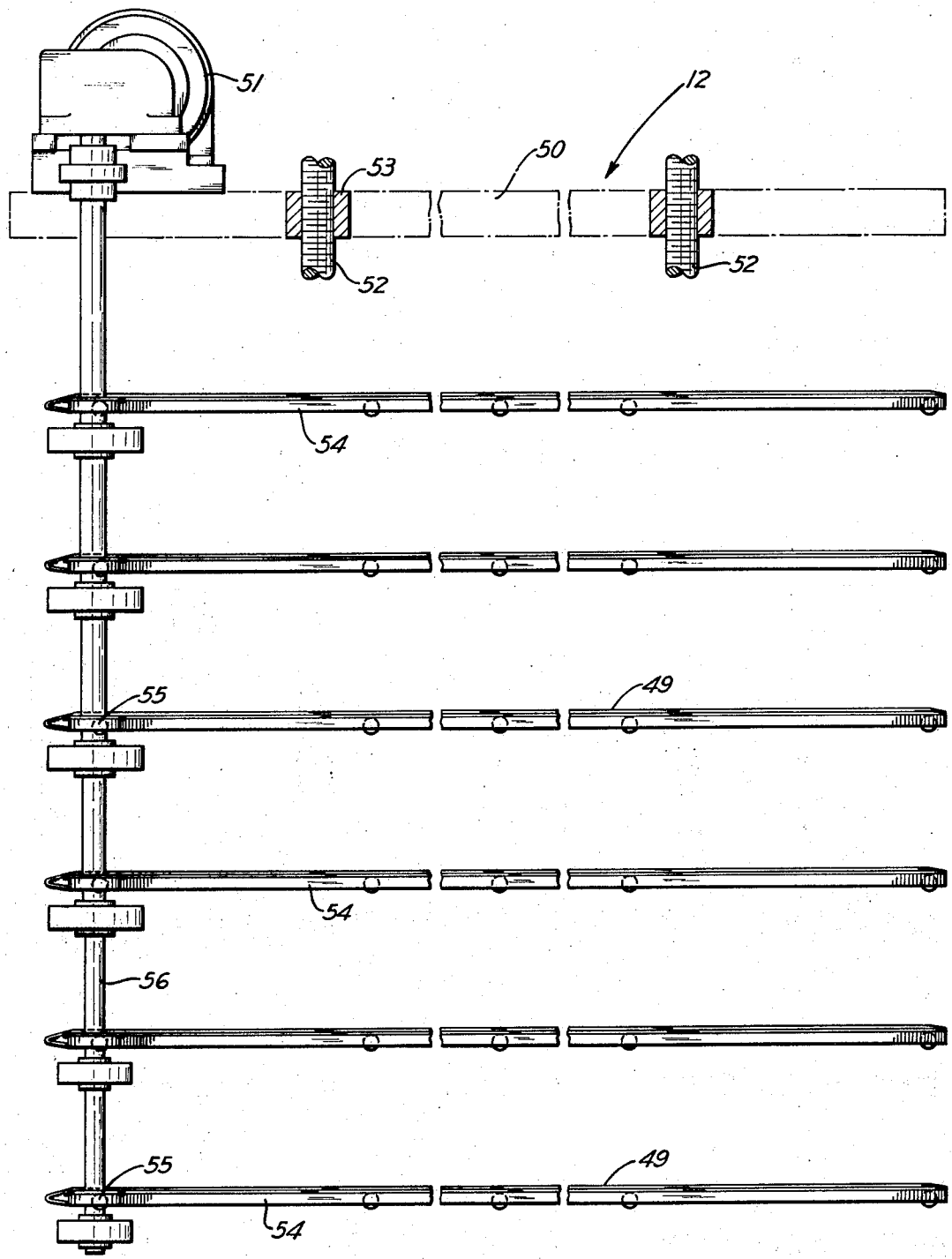

These objects, as well as other novel features and advantages of the present invention, will be better understood when the following description is read along with the accompanying drawings of which:

FIG. 1 is a diagrammatical view of the portion of a fiberboard manufacturing line between the mat transfer station and the press unloader station, FIG. 2 is a plan view of the mat transfer and conveyor illustrated in FIG. 1, FIG. 3 is an elevational view of the equipment illustrated in FIG. 2, FIG. 4 is an elevational view of a second employment of a mat transfer and loader, FIG. 5 is an end elevational view of the mat transfer shown in FIG. 4, FIG. 6 is a plan view of a still further employment of a mat transfer, FIG. 7 is an elevational view of the mat transfer illustrated in FIG. 6, FIG. 8 is a sectional view taken on lines 8—8 of FIG. 6, FIG. 9 is a sectional view taken on lines 9—9 of FIG. 6, FIG. 10 is an elevational view of the loader illustrated in FIG. 1, and FIG. 11 is an elevational view of still another form of a mat transfer device.

In referring first to FIG. 1, there is diagrammatically shown the adjacent stations associated with a fiberboard press 9 in which, starting with the arrow, indicating the direction of flow of the material, there is provided a conveyor 10 over which the mats, which have been previously formed into a rectangular shape, measuring approximately 13 ft. long × 8 ft. wide × 4 in. thick, are brought individually by the conveyor to a mat transfer station 11. The mats may be made up of various particles, as, for example, particles of fir or hemlock, and are in a very fragile, porous condition as they are discharged onto the conveyor 10.

Cooperating with the conveyor 10 is the mat transfer 11, whose basic purpose is to efficiently and rapidly take the mats from the conveyor and transfer them to a loading station 12 arranged adjacent to the upstream side of the mat transfer 11. The loading station, while not illustrated in FIG. 1, but which will be more apparent from the other drawings, comprises a number of openings, each for receiving a pile of mats, the mats being individually transferred into the openings of the loader by the mat transfer 11 and formed into a number of discrete piles. The number of piles or openings correspond to a similar number of openings of the press 9 arranged adjacent to the upstream end of the loading station. The press is of a well-known construction comprising a number of vertically displaceable platens between which the piles of mats are placed and compressed under heat into individual boards.

Once the boards have been formed in the pressing station 9, they are adapted to be discharged to an unloading station 14 which, like the loading station 12, is provided with a number of openings corresponding to the openings of the press 9, each opening receiving one of the boards formed by the press.

Before leaving FIG. 1 it should be noted that the arrows associated with the various stations are designed to depict the movement of the apparatus through the normal operating sequence. The mat transfer station and the loading station to which the present invention particularly relates will now be more fully described in referring to the subsequent drawings of FIGS. 2–11.

In referring to FIGS. 2 and 3 which illustrate the preferred form of the mat transfer 11, there is provided a carriage 18 which moves in the direction the material or mats flow to the press over a pair of spaced-apart tracks 19 which the carriage 18 engages by means of two pairs of wheels 20 and 21. The tracks 19 are supported by upright members 22 through structural cross members. The carriage 18 is traversed over the conveyor 10 towards and away from the mat transfer station 11 by a rack 23 and a pinion 24, the pinion being driven by an electrical motor 25 shown only in FIG. 3. Shown also in FIG. 3 is the extended portion of the carriage 18 which takes the form of a rectangular structural member 26 on which member the pairs of wheels 20 and 21 are rotatably mounted. On the extreme lefthand side of the structural member 26 there is provided a restraint member 27 which, as shown in FIG. 2, is made long enough to provide an adequate pushing surface for the maximum width mat. FIG. 3 illustrates the restraint member 27 in its operative position.

It will be appreciated when the carriage 18 is retracted to the right, as one views FIG. 3, that the restraint member 27 is adapted to be swung out of the path of flow of the mats so that a mat can pass under the carriage, and particularly under the restraint member 27, until the end of a mat has passed the member after which the member is adapted to be moved down to an engaging position with respect to the mat. It is the fundamental function of the carriage 18 to guide, restrain and assist the soft mats, one at a time, from the conveyor 10 unto the upper surface of a gas or air plate 31. FIG. 3 illustrates a mat M so supported at the extreme left end of the plate 31. The plate is supported along most of its opposite longitudinal ends by structural members 32 and 33, the inner faces of which have a certain vertical depth that provide for sideway restraint and guiding of the mats when transferred from the conveyor 10 onto the plate 31. The plate 31 and side members 32 and 33 actually are cantilever mounted from a second carriage 34 which is supported by two sets of wheels 35 and 36 by longitudinally extending structural track members 37 and 38. These members are supported by the upright members 22 throughout the mat transfer station so that the carriage 34 travels from the adjacent end of the conveyor 10 to the loading station 12. FIG. 3 actually shows in phantom the forwardmost position of the wheels 35 of the carriage adjacent the loading station 12.

Returning now to the air plate 31, it is a feature of the present invention that the plate be provided with orifices 39 for discharging gas or air under a controlled pressure, which medium is conveyed to the interior of the plate by flexible hoses 41 connected at the back, the orifices being provided throughout the top surface of the plate 31, as illustrated in FIG. 2, allowing a mat supported by the plate to be lifted from the plate and to be supported, partially or totally by the gas or air. It will be appreciated that although the mat is very porous and fragile, there is enough surface continuity and resistance formed by the matted particles to allow the mat to be urged as an integral piece so that the plate can be peeled or moved relative to the bottom surface of the mat and the mat gently deposited in the loading station 12, the exact operating procedure of which will be explained more fully hereinafter.

As in the case of the carriage 18, the carriage 34 is advanced over the structural members 37 and 38 by a rack 42 which engages a pinion 43 secured to the carriage 34, the pinion being driven by an electrical motor 44 secured to the carriage 34 on the right-hand side thereof.

In referring now to the end of the mat transfer apparatus 11 adjacent to the loading station 12, the structural members 37 and 38 at their far end are adapted to support a pivotal arm 45. FIG. 3 shows the arm and its restraint member 46 in their operative position, to which position they are selectively brought by a piston cylinder assembly 47. The arm 45 is, of course, raised to an out-of-the-way position when a mat is being transferred by the plate 31 to the loading station, after which it is brought into the lower position to engage the back edge of the mat. FIG. 2 illustrates, as in the case of the restraint member 27 that the restraint member 46 is made long enough to engage substantially the entire back end of a mat positioned in the loading station 12.

Now in describing the loading station 12, in addition to referring to FIG. 3, reference will be made to FIG. 10 which better illustrates the general outline of the loader apparatus of FIG. 3, although functioning somewhat differently. As shown in FIG. 10, the loading apparatus 12 consists of a number of vertically arranged horizontally extending table members 49, each having a maximum opening as defined by the total aggregate height of the number of mats that will eventually be placed in the openings, and which mats will be pressed into a single board by the press 9. The tables 49 are moved vertically in unison so that each table can be brought into alignment or registry with the plate 31 and receive mats transferred by the plate. The vertical movement and indexing of the tables 49 can be accomplished by several well-known mechanisms. In FIG. 10 it will be noted that a vertical movable platen 50 supported and guided by a frame, not shown, carries the entire table assembly including a motor 51 which, in turn, is carried by four spaced-apart vertically arranged screws 52, two of which are only shown in FIG. 10. The screws are held against vertical movement and received in nuts 53 that advance vertically on rotation by worm-wheels driven by worms and a common motor, not shown. By controlling the rotation of the screws, the tables can be caused to move into aligned positions with respect to the air plate 31 of the mat transfer station 11 and the press 9.

In addition, the tables 49 are adapted to be moved longitudinally into openings formed in the press 9. The press, of course, will have a number of openings equalling that of the loading station so that by advancing the tables 49 into the press openings the piles of mats formed on the tables are transferred to the press. This movement is accomplished by providing a rack 54 on each table which is engaged by a pinion 55, the pinion being secured to a vertical shaft 56 which is driven by the gear reducer-electrical motor unit 51. It will be appreciated that the customary supporting structure for the tables has not been illustrated in FIG. 10 in order to better show the tables and their driving means.

Before leaving the description of the loading device illustrated in FIG. 10 and in commenting on the basic differences between the FIG. 10 loading device and the one illustrated in FIG. 3, it should be noted in both cases that each table 49 and 59, respectively, is constructed essentially similar to the air plate 31 of the mat transfer station 11 so that each plate is adapted to have supplied to it gas or air under a controlled pressure, which medium discharged from orifices provided at the top of each table is designed to lift, partially or totally, not only a single mat, but in this case, a pile of mats off the tables 49 and 59 so that once the piles of mats have been transferred to the press 9, the tables can be withdrawn or peeled out from under the piles as the piles are deposited in the openings of the press. In FIG. 10 a pile of mats formed in the station 11 is brought to each table 49; whereas, in FIG. 3 a single mat is brought to the tables 59 and after the plate 31 has been retracted, leaving a mat on a table, the table is lowered a distance equal to the height of the mat so that a second mat can be brought to the loading station and deposited on the top surface of the first mat.

FIG. 3 also shows the supporting arrangement for the tables 49 and 59 which consist of a number of rollers 60 that engage permanently mounted rails 61, the rails being supported by the outer structure of the loader 12 made up, in part, by crosspiece 50 and the screws 52, shown in FIG. 10. The end of each table 49 and 59 is tapered at 62 and provided with a pushing edge that is used to contact a board formed by a previous pressing operation when the loader 12 is moved into the press 9. During this operation the portions 62 of the tables engage the boards and push them out of the press onto the unloading station 14. In this case the unloader will be in a position so that its openings line up with the openings of the press and not in the position it assumes in FIG. 1 which shows the position of the unloader when the boards are being removed from the unloader.

In briefly describing the cooperative operations of the equipment for handling and transferring the mats to the press station 9, the individual mats are brought to the mat transfer station 11 by the conveyor 10 while air is being applied to the air plate 31. As so brought, they are sufficiently spaced apart to allow the restraint member 27 of the carriage 18 to be brought adjacent to the back edge of the mat. As the carriage 18 is advanced by operation of the motor 25, the mat is transferred from the conveyor 10 during which period the mat is at least partially supported by air from the air plate 31 of the mat transfer station 11. The plate, of course, will have previously been positioned in its receiving station illustrated in FIG. 3 by retracting the carriage 34 on operation of the motor 44. The carriage 18 will advance to a point where the mat is supported by the air and the plate 31 or totally by air after which the carriage will be free to be retracted in preparation for engaging and transferring the next mat discharging from the conveyor 10 and the air discontinued from the plate 31 to allow the mat to settle on the plate.

After the mat has been positioned on the plate 31, the carriage 34 will be operated by the motor 44 to transfer the mat from the mat transfer station 11 to the loading station 12. In preparation to receiving the transferred mat, the loader of the loading station 12 will be positioned so that its uppermost opening will be in line with the plate 31 and its first table 59 will be in readiness to receive the mat. Once the carriage 34 has arrived at the end of its travel and before it is retracted, the arm 45 and the restraint member 46 are lowered so that the restraint member will be engaged by the adjacent edge of the mat. With the restraint member so positioned, gas or air is introduced again into the plate 31 in order, partially or totally, to lift the mat from the plate and the carriage 34 can be withdrawn. As the plate 31 moves relative to the adjacent surface of the mat, the far end passes free of the mat and the mat will settle onto the table 59 of the loader 12. After the plate is completely peeled from the mat, the air pressure is discontinued and the plate is arranged in readiness to receive the next mat. In the meantime, the loader will be lowered a distance approximately equal to the thickness of the mat so that the next mat may be brought to the loading station and deposited on the previous mat. This operation is continued until the opening is filled with mats, after which the loader will be raised to bring into position another opening to be filled by the mat transfer apparatus.

When the loading station is completely filled and after the press 9 has completed the pressing operation on the previous groups of mats delivered to it, the motor 51 is operated to move each of the tables 59 into the openings of the press. During this action the end portions 62 of the tables will engage the boards previously formed and supported by the platens of the press to push them out of the press onto the unloader 14. After the tables 59 are positioned within the press, gas or air is simultaneously admitted to each table to lift, partially or totally, their respective piles so that the tables may, in unison, be withdrawn from the press by reverse operation of the motor 51. The press will include restraint members similar to restraint member 46 for restraining movement of the piles in a direction opposite to the retracting movement of the tables 59, two such members beng shown in FIG. 1.

FIGS. 4 and 5 show a second embodiment of the mat transfer apparatus which is designed to form a pile of mats in the mat transfer station instead of in the loading station as explained with respect to the equipment illustrated in FIGS. 1-3. In this embodiment the only difference in the loading station 12 is that there is no need to provide for lowering the respective tables relative to the air plate 31 in order to allow a pile of mats to be formed in each opening. Since the piles are formed in the transfer station 11, it is only necessary that the loader be moved vertically to bring each opening thereof into a position to receive a pile of mats.

In referring to FIG. 4 it will be noted that the construction of the table 65 is basically similar to the construction of the tables 59 of FIG. 3. In this embodiment the table 65 is positioned between the tables 59 and the air plate 31 from which it receives mats in a manner similar to a way the air plate transferred mats to the tables 59 in the first embodiment, there being also included with the table 65 a restraining member, shown in FIG. 4, similar to the member 46 of FIG. 3. The table 65 is supported on spaced-apart rails 66 through a series of rollers 67 which are advanced by having a rack 68 engaged by a pinion 69 which is driven by a reducer-electrical motor unit 70. In this case, however, the rails 66 are supported by a substructure 71 relative to which the table 65 moves on operation of the motor 70. The substructure is connected to identical crank assemblies 72 which are driven by a motor-gear unit 73 and through which means the table will be lowered progressively a total amount equal to the maximum height of the pile of mats to be formed on the table 65.

As in the previous arrangement, after the air plate 31 has supplied the required number of mats to make up a pile, the table 65 is supplied with gas or air from flexible hoses 74, which medium is admitted from the top surfaces through orifices, so as to urge the pile of mats from the table when the table has been moved to the loading station 12, a part of which is shown in FIG. 4 and which is more completely shown in FIG. 10 which has already been described. It should be noted in FIG. 4 that in the loading station there is a vertical displaceable arm 76 having at its lower end a restraint member 77 which is selectively brought into engagement with the back surfaces of a pile of mats and which resist movement of the pile when the table 65 is retracted from the loading station.

In referring now to the third embodiment of equipment for moving the pile of mats, reference is now made to FIGS. 6, 9 and 11. In this arrangement, as in the arrangement of FIGS. 4 and 5, a pile of mats is first formed in the mat transfer station 11 and then transferred to the loading station 12. FIG. 7 shows a table 80 similar in construction to the table 65 of the FIG. 4 embodiment although not employing an elevating mechanism, so that a description thereof will not be repeated. The table is advanced to the loading station 12 by being provided with a rack 81 which is engaged at one side by a pinion 82, the pinion being driven by a motor-gear unit 83. In referring to FIG. 6, it will be noted that the table 80 is restrained on one side by the pinion 82 and by a freely rotatable guide roller 84 and on the other by a set of vertical rollers 85 and a horizontal roller 86, rollers 85 and 86 best being shown in FIG. 9. FIG. 8 also shows the pinion 82 and the rack 81 along with the rollers of the table 80. Gas or air is fed into the interior of the table 80 through hoses 88, FIG. 6 illustrating the internal webbing forming the passageways that supply air to the top surface of the table where it is discharged through orifices and by which means a pile of mats, diagrammatically shown in FIG. 7 is partially or totally lifted from the table 80. This construction is followed also with respect to the tables 49, 59 and 65 as well as for the air plate 31.

The essential differences between the embodiment shown in FIGS. 6, 9 and 11 from the embodiments of the earlier arrangement of FIGS. 4 and 5, has to do with the method and apparatus for bringing the individual mats to the mat transfer station 11. FIG. 11 illustrates a vacuum device 90 which receives individual mats from the conveyor 11, and lifts them one at a time from the conveyor and transports them to the mat transfer station 11, where the mats are made up into a pile preparatory to being delivered to the loading station 12. The vacuum device 90 comprises a hood 91 supported by a single column 92 which is vertically movable and guided by two sets of three rollers 93, each set being carried by a carriage 94. The column 92 and the hood 91 are raised by there being provided a rack 95 which meshes with a pinion 96 driven from a motor 97, all of which are carried by the carriage 94. The pinion also cooperates with the sets of rollers 93 to further restrain the column 92. The column 92 is hollow and to which there is connected a flexible tube 98 from where suction pressure is delivered to the hood 91. The carriage is carried by a longitudinally extending pair of rails 99 supported by a substructure 101 which, in turn, is supported by vertical column 102. The carriage engages the rails 99 by two pairs of wheels 103 which are driven so as to advance the carriage and, hence, the hood 91 from a receiving position to a position within the mat transfer station 11.

In accordance with the provisions of the patent statutes, I have expalained the principle and operation of my invention and have illustrated and described what I consider to represent the best embodiment thereof.

I claim:

1. In a method of transporting in a processing line a thin sheetlike workpiece, the steps comprising:
   transferring a workpiece to a support member arranged in a first station so that the member assumes a supporting relationship with one face of the transferred workpiece,
   a loading station adapted to form a number of discrete piles of workpieces,
   causing said member to transfer a workpiece to said loading station and return to said first station,
   positioning said workpiece in said loading station in order that a second workpiece can be deposited on said workpiece to form a pile of workpieces, moving said pile formed in said loading station so as to allow one or more additional discrete piles in a similar manner to be formed, said piles in said loading station being each supported by additional support members, causing said additional support members to move to a press station while supporting said discrete piles, applying gas to the supported faces of said piles through the supporting surfaces of their associated additional support members to cause the discrete piles to be urged away from their associated additional support members and to be at least partially supported by gas, and causing said additional support members to move away from said press station while the piles are being at least partially supported by gas, whereby the unsupported and increasingly exposed portions of the piles come to rest in said press station.

2. In a method according to claim 1, the additional step of restraining the piles of workpieces in a direction opposite to the movement of said additional support members when moving away from said press station.

3. In a method according to claim 1, including the additional steps of:
causing said additional members to engage and transfer from the press station the pressed workpieces formed of piles in said press station from a previous transfer operation when said additional members are moved from said loading station to said press station and before the piles supported by said additional members are deposited in said press station.

4. In a method of transporting in a processing line a thin sheetlike workpiece, the steps comprising:
depositing a single workpiece on a member so that the member assumes a supporting relationship with one face of the transferred workpiece,
causing said member to move to a first station while supporting a workpiece,
applying a gas to the supported face of the workpiece through the supporting surface of said member to cause said workpiece to be urged away from the member to be at least partially supported by gas,
causing said member to move away from said first station while said workpiece is being at least partially supported by gas, whereby the unsupported and increasingly exposed portions of the workpiece come to rest in said first station,
said first station including an additional member,
transferring a number of workpieces to said additional member when in said first station and placing them one upon another to form a pile in said first station, said transfer being such that the additional member assumes a supporting relationship with the lower face of the pile, and
moving said additional member while it is supporting a pile to a loading station where the pile is deposited by said member.

5. In a method according to claim 4, the additional step of restraining said single workpiece in the direction opposite the movement of said additional member when moving away from said first station.

6. In a method according to claim 4, the additional step of applying a gas through the supporting surface of said additional support member when receiving a workpiece to be transferred to said first station to at least partially support the weight of a workpiece.

7. In a method of transporting in a processing line a thin sheetlike workpiece, the steps comprising:
transferring a number of workpieces to a member when in a first station and placing them one upon another to form a pile in said first station, said transfer being such that the member assumes a supporting relationship with the lower face of the pile,
moving said member while it is supporting a pile to a loading station where the pile is deposited by said member,
causing two or more said so formed discrete piles to be each supported by additional support members in said loading station, so that said additional members assume a supporting relationship with the lower faces of the piles,
causing said additional support members to move to a press station while supporting said piles,
applying gas to the supported faces of said piles through the supporting surfaces of said additional members to cause the discrete piles to be urged away from their associated additional support members and to be at least partially supported by gas, and
causing said additional support members to move away from said press station while the piles are being at least partially supported by gas, whereby the unsupported and increasingly exposed portions of the piles come to rest in said press station.

8. In a method according to claim 7, the additional step of restraining said piles in a direction opposite the movement of said additional members when moving away from said press station.

9. In a method according to claim 7, including the additional steps of:
causing said additional members to engage and transfer from the press station the pressed workpiece formed of piles in said press station from a previous transfer operation when said additional members are moved from said loading station to said press station and before the piles supported by said additional members are deposited in said press station.

10. In an apparatus for transporting in a processing line a thin sheetlike workpiece, comprising:
means for transferring a workpiece to a first station,
a member arranged in said first station for receiving a transferred workpiece and adapted to assume a supporting relationship with one of the faces of said workpiece,
a loading station adapted to form a number of discrete piles of workpieces,
means for transferring a workpiece from said first station to said loading station and to return to said first station,
said loading station including means for allowing a succeeding workpiece to be placed on top of a previous workpiece to form a pile,
said loading station also including means for moving a formed pile of workpieces so as to allow one or more additional piles to be similarly formed in said loading station, and
means for moving said formed piles in unison from said loading station to a press station.

11. In an apparatus according to claim 10 wherein said means for applying gas through the supporting surface of said member includes means for applying gas during the period a single workpiece is being transferred to said member.

12. In an apparatus according to claim 10, including means for restraining said single workpiece in a direction opposite to the returning movement of said member.

13. An apparatus according to claim 10 in which said loading station includes additional support members for separately supporting each pile formed in said loading station,
said means for moving said piles from said loading station to said press station including means for moving each of said additional members in unison,
means for applying gas to the supported faces of the piles through the supporting surfaces of their associated additional support members to cause the piles to be urged away from their associated members and to be at least partially supported by gas, and
means for causing said additional members to move away from said press station while the piles are being at least partially supported by gas, whereby the unsupported and increasingly exposed portions of the piles come to rest in said press station.

14. In an apparatus according to claim 13, including means for restraining said piles of workpieces in a direction opposite the movement of said additional support members away from said press station.

15. In an apparatus according to claim 13 wherein said additional members include means for engaging and transferring from the press station the pressed workpieces formed of piles in said press station from a previous transferred operation when said additional members are moved from said loading station to said press station and before the piles supported by said additional members are deposited in said press station.

16. In an apparatus for transporting in a processing line a thin sheetlike workpiece, comprising:
means for transferring a workpiece to a first station,
a member arranged in said first station for receiving a number of workpieces placed one upon the other to form a pile of workpieces and adapted to assume a supporting relationship with one of the faces of the lower most workpiece,
means for causing said member to move to a loading station adapted to receive a number of discrete piles of workpieces,
means for applying gas to the supported face of said lower most workpiece through the supporting surface of said member to cause said pile to be urged away from said member and to be at least partially supported by gas,
means for causing said member to move away from said loading station while said pile is being at least partially supported by gas, whereby the unsupported and increasingly exposed portions of said pile come to rest in said loading station,
said loading station including for each pile additional support members,
means for moving said additional support members to a press station while supporting said piles,
means for applying gas to the supported faces of said piles through the supporting surfaces of said additional support members to cause the discrete piles to be urged away from their associated members and to be at least partially supported by gas, and
means for causing said additional members to move away from said press station while the piles are being at least partially supported by gas, whereby the unsupported and the increasingly exposed portions of the piles come to rest in said press station.

17. In an apparatus according to claim 16, including means for restraining said piles of workpieces in a direction opposite the movement of said additional members away from said press station.

18. In an apparatus according to claim 16 wherein said additional members include means for engaging and transferring from the press station the pressed workpieces formed of the piles in said press station from a previous transfer operation when said additional members are moved from said loading station to said press station and before the piles supported by said additional members are deposited in said press station.

19. In an apparatus for transporting in a processing line a thin sheetlike workpiece, comprising:
a member for transferring a workpiece to a first station,
means for causing said member to move to said first station when supporting a workpiece,
means for applying a gas to the supported face of a workpiece through the supporting surface of said member to cause said workpiece to be urged away from said member and to at least be partially supported by gas,
means for causing said member to move away from said first station while a workpiece is being at least partially supported by gas, whereby the unsupported and increasingly exposed portions of said pile come to rest in said first station,
an additional member arranged in said first station for receiving a number of transferred workpieces placed one upon the other to form a pile of workpieces in said first station and adapted to assume a supporting relationship with one of the faces of the lower most workpiece,
a loading station adapted to receive a number of discrete piles of workpieces from said first station,
means for causing said additional member to move to said loading station while said additional member is supporting a pile,
means for applying gas to the supported face of said lower most workpiece of said pile through the supporting surface of said additional member to cause said pile to be urged away from said additional member and to be at least partially supported by gas, and
means for causing said additional member to move away from said loading station while said pile is being at least partially supported by gas, whereby the unsupported and increasingly exposed portions of pile come to rest in said loading station.

20. In an apparatus according to claim 19, wherein said means for applying gas through the supporting surface of said additional member includes means for applying gas during the period said additional member is receiving a workpiece for transfer to said first station.

21. In an apparatus according to claim 19, including means for restraining a workpiece in a direction opposite the movement of said additional member away from said first station.

22. In an apparatus for transporting in a processing line a thin sheetlike workpiece or a pile of such workpieces, comprising:
- a vacuum device for transferring a workpiece to a first station,
- means for supporting said vacuum device between a pickup station and said first station,
- a member arranged in said first station for receiving a transferred workpiece and adapted to assume a supporting relationship with one of the faces of said workpiece or pile,
- means for moving said vacuum device from said pickup station to a position over said member when arranged in said first station,
- means for causing said member to move to a second station while said member is supporting said workpiece or pile,
- means for applying gas to the supported face of said workpiece or pile through the supporting surface of said member to cause said workpiece or pile to be urged away from said member and to be at least partially supported by gas, and
- means for causing said member to move away from said second station while the workpiece or pile is being at least partially supported by gas, whereby the unsupported and increasingly exposed portions of said workpiece or pile come to rest in said second station.

23. In an apparatus for transporting in a processing line a thin sheetlike workpiece or a pile of such workpieces, comprising:
- means for transferring a workpiece or pile of workpieces to a first station,
- a member arranged in said first station for receiving a transferred workpiece or pile and adapted to assume a supporting relationship with one of the faces of said workpiece or pile,
- means for causing said member to move to a loading station while said member is supporting said workpiece or pile,
- means for applying gas to the supported face of said lower most workpiece through the supporting surface of said member to cause said workpiece to be urged away from said member and to be at least partially supported by gas,
- means for causing said member to move away from said loading station while the pile is being at least partially supported by gas, whereby the unsupported and increasingly exposed portions of said pile come to rest in said loading station,
- said loading means including a number of additional support members arranged in a spaced-apart fashion for separately supporting a number of piles of workpieces, and
- means for moving said additional support members into registry with the path of transfer of a workpiece or pile from said first station to said loading station.

* * * * *